(12) United States Patent
McCoy et al.

(10) Patent No.: US 11,383,999 B1
(45) Date of Patent: Jul. 12, 2022

(54) PORTABLE APPARATUS AND METHOD FOR TREATING WASTEWATER

(71) Applicants: Justin Garrett McCoy, Magnolia, TX (US); Jeffery Paul LeBlanc, Youngsville, LA (US); Gary Wayne Bledsoe, Leakey, TX (US)

(72) Inventors: Justin Garrett McCoy, Magnolia, TX (US); Jeffery Paul LeBlanc, Youngsville, LA (US); Gary Wayne Bledsoe, Leakey, TX (US)

(73) Assignee: TANMAR RENTALS, LLC, Eunice, LA (US)

( * ) Notice: Subject to any disclaimer, the term of this patent is extended or adjusted under 35 U.S.C. 154(b) by 0 days.

(21) Appl. No.: 16/685,842

(22) Filed: Nov. 15, 2019

Related U.S. Application Data

(60) Provisional application No. 62/768,817, filed on Nov. 16, 2018.

(51) Int. Cl.
| | | |
|---|---|---|
| *C02F 9/00* | (2006.01) | |
| *C02F 1/00* | (2006.01) | |
| *C02F 1/44* | (2006.01) | |
| *C02F 3/12* | (2006.01) | |
| *C02F 1/68* | (2006.01) | |
| *C02F 1/76* | (2006.01) | |

(52) U.S. Cl.
CPC .............. *C02F 9/005* (2013.01); *C02F 1/008* (2013.01); *C02F 1/004* (2013.01); *C02F 1/44* (2013.01); *C02F 1/688* (2013.01); *C02F 1/76* (2013.01); *C02F 3/1278* (2013.01); *C02F 2201/008* (2013.01); *C02F 2209/008* (2013.01); *C02F 2209/40* (2013.01); *C02F 2209/42* (2013.01)

(58) Field of Classification Search
None
See application file for complete search history.

(56) References Cited

U.S. PATENT DOCUMENTS

| | | |
|---|---|---|
| 3,377,271 A | 4/1968 | Cann |
| 3,700,590 A | 10/1972 | Burton |
| 3,764,011 A | 10/1973 | Owens |
| 3,779,911 A | 12/1973 | Freudenthal et al. |
| 4,073,722 A | 2/1978 | Grutsch et al. |
| 4,292,176 A | 9/1981 | Grutsch et al. |
| 4,618,421 A | 10/1986 | Kantor |
| 5,173,184 A | 12/1992 | Krieger |
| 5,288,737 A | 2/1994 | Krieger |
| 5,423,981 A | 6/1995 | Krieger |
| 5,492,620 A | 2/1996 | Evans |
| 5,958,240 A | 9/1999 | Hoel |
| 6,190,548 B1 | 2/2001 | Frick |
| 6,217,768 B1 | 4/2001 | Hansen et al. |
| 6,235,339 B1 | 5/2001 | Harmon et al. |
| 6,319,412 B1 | 11/2001 | Reyna |
| 6,383,372 B1 | 5/2002 | Houch et al. |

(Continued)

OTHER PUBLICATIONS

Mobile Wastewater Treatment by Orenco Systems in Sutherlin, OR; see website at https://www.orenco.com/applications/mobile.

(Continued)

*Primary Examiner* — Richard C Gurtowski
(74) *Attorney, Agent, or Firm* — Greg Mier

(57) ABSTRACT

A portable, multi-step apparatus and method for treating domestic sewage in remote locations.

15 Claims, 12 Drawing Sheets

(56) References Cited

U.S. PATENT DOCUMENTS

| | | | |
|---|---|---|---|
| 6,616,834 | B2 | 9/2003 | Anderson |
| 7,022,233 | B2 | 4/2006 | Chen |
| 7,306,724 | B2 | 12/2007 | Gordon |
| 7,459,077 | B2 | 12/2008 | Staschik |
| 8,034,238 | B2 | 10/2011 | Ghalib |
| 8,597,522 | B2 | 12/2013 | Ghalib |
| 8,758,630 | B1 | 6/2014 | Britenstine |
| 2003/0070977 | A1 | 4/2003 | Anderson |
| 2005/0139530 | A1* | 6/2005 | Heiss ............ C02F 9/00 210/85 |
| 2012/0097590 | A1* | 4/2012 | Early ............ C02F 3/1247 210/198.1 |
| 2012/0228229 | A1 | 9/2012 | Douglas |
| 2012/0261337 | A1 | 10/2012 | Weiss |
| 2012/0312755 | A1 | 12/2012 | Ryan et al. |
| 2013/0134089 | A1 | 5/2013 | Cote |
| 2014/0299554 | A1 | 10/2014 | Britenstine |

OTHER PUBLICATIONS

Modular sewage treatment plant by ClearFox in Bayreuth; see website at https://clearfox.com/containerised-systems/.

BioContainer—Containerized wastewater treatment plant by Biokube; see website at https://www.biokube.com/biocontainer-wastewater-systems-in-container/.

James Clarke, Temporary wastewater treatment and portable wastewater treatment solutons by Biocelwater; see website at https://biocellwater.com/temporary-wastewater-treatment.

Jayant Row, Portable Wastewater Treatment Plants—Ecologically Sound Wastewater Management for Mobile Operations by Geotechnical Engineering.

Package Wastewater Treatment Plants by Pollution Control Systems, Inc. in Milford, OH; see website at http://www.pollutioncontrolsystem.com/packaged-plants.

Temporary Bypass Plants by AUC Group in Houston, TX; see website at https://aucgroup.net/temporary-by-pass-plants/.

Package Plants by AquaPoint in New Bedford, MA; see website at https://www.aquapoint.com/products/package-plants/.

Mobile Systems by Ovivo; see website at https://www.ovivowater.com/solution/municipal/municipal-wastewater/mobile-systems/.

Biorock Sewage / Waste water treatment plants by Biorock Wastewater Treatment; see website at https://biorock.com/products.

Portable Waste Water Treatment by Solana Power; see website at http://www.solanapower.com/clean-water-and-emergency-water-purification/portable-waste-water-treatment-plant.ht.

The Reclaimer Rig by WaterFleet in San Antonio, TX; see website at https://waterfleet.com/products/the-reclaimer-rig/.

Mobile Wastewater Treatment Solutions by EcoSphere Technologies, Inc. in Stuart, FL; see website at https://ecospheretech.com/water-treatment-services/mobile-wastewater-treatment.

Temporary wastewater treatment and portable wastewater treatment solutions by Biocellwater.com; see website at https://biocellwater.com/temporary-wastewater-treatment-portable.

Residential Wastewater Treatment for Wastewater and Grey Water Recycling and Reuse by Jet Wastewater Treatment Solutions; see website at https://www.jetincorp.com.

Wastewater Recovery and Recycling Systems by Mech-Chem Associates, Inc.; see website at http://www.mech-chem.com/index.php/wastewater-treatment-systems.

\* cited by examiner

PORTABLE APPARATUS AND METHOD FOR TREATING WASTEWATER

CROSS REFERENCE TO RELATED APPLICATIONS

The present application claims priority from provisional patent application no. 62/768,817, filed on Nov. 16, 2018.

FIELD OF THE INVENTION

The subject invention relates to portable, multi-step apparatus and method for treating domestic sewage waste in remote locations.

BACKGROUND

Domestic sewage waste includes waste liquid from toilets, baths, showers, kitchens, and sinks draining into sewers. Treating domestic sewage waste can be accomplished by using physical, chemical, and biological processes to remove contaminants from the waste and producing an effluent that will do as little harm as possible when discharged to the surrounding environment. The present invention uses a unique multi-step apparatus and method for treating domestic sewage waste.

BRIEF DESCRIPTION OF THE DRAWINGS

The accompanying drawings are provided for the purpose of illustration only and are not intended as a definition of the limits of the present invention. The drawings illustrate a preferred embodiment of the present invention, wherein.

DESCRIPTION OF THE INVENTION

While the present invention will be described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present invention not be limited to the particular embodiments disclosed as the best mode contemplated for carrying out this invention, but that the invention will include all embodiments (and legal equivalents thereof).

Figure 1:
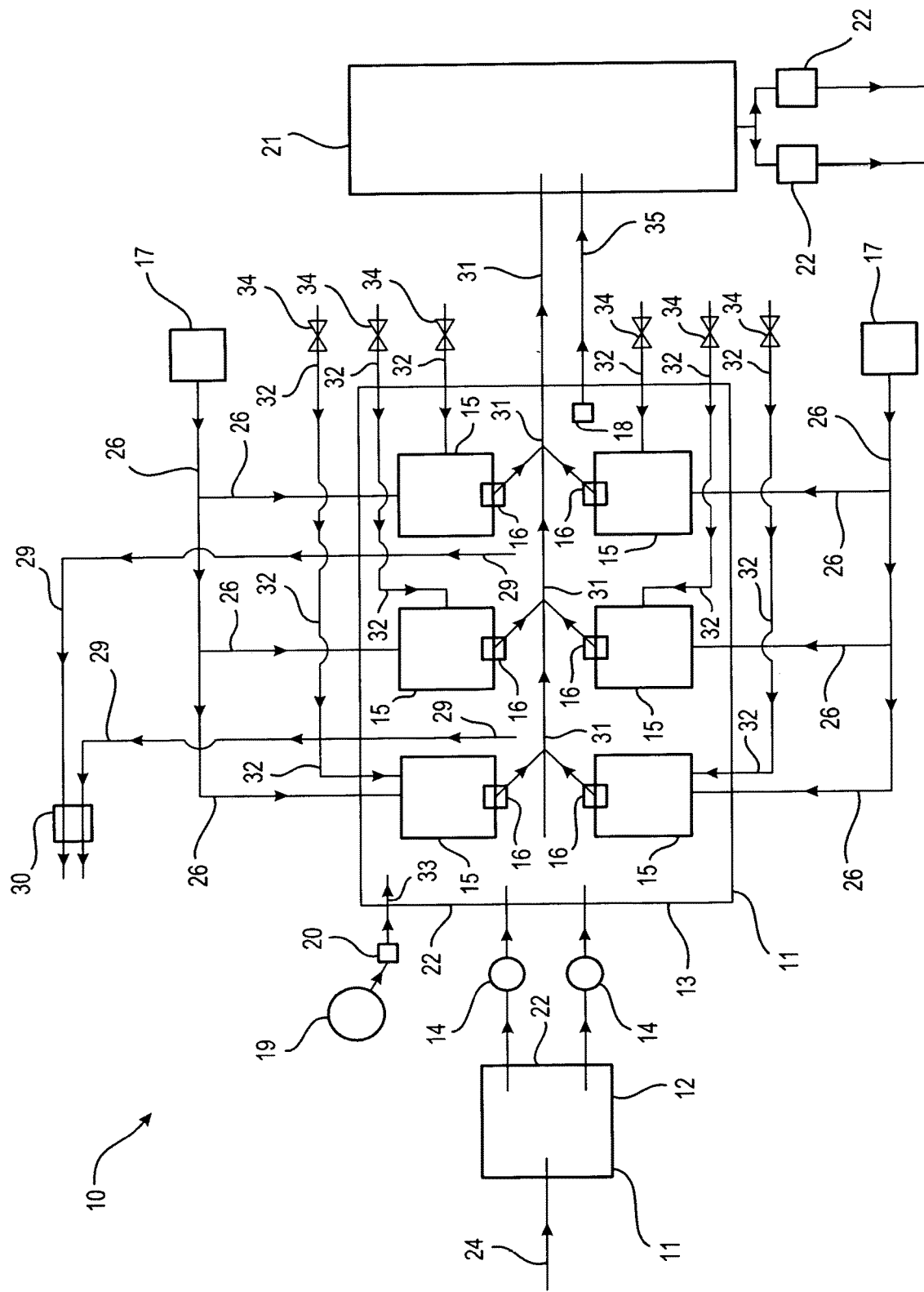
FIG. 1 is a flow diagram of wastewater treatment system 10.
Figure 2:
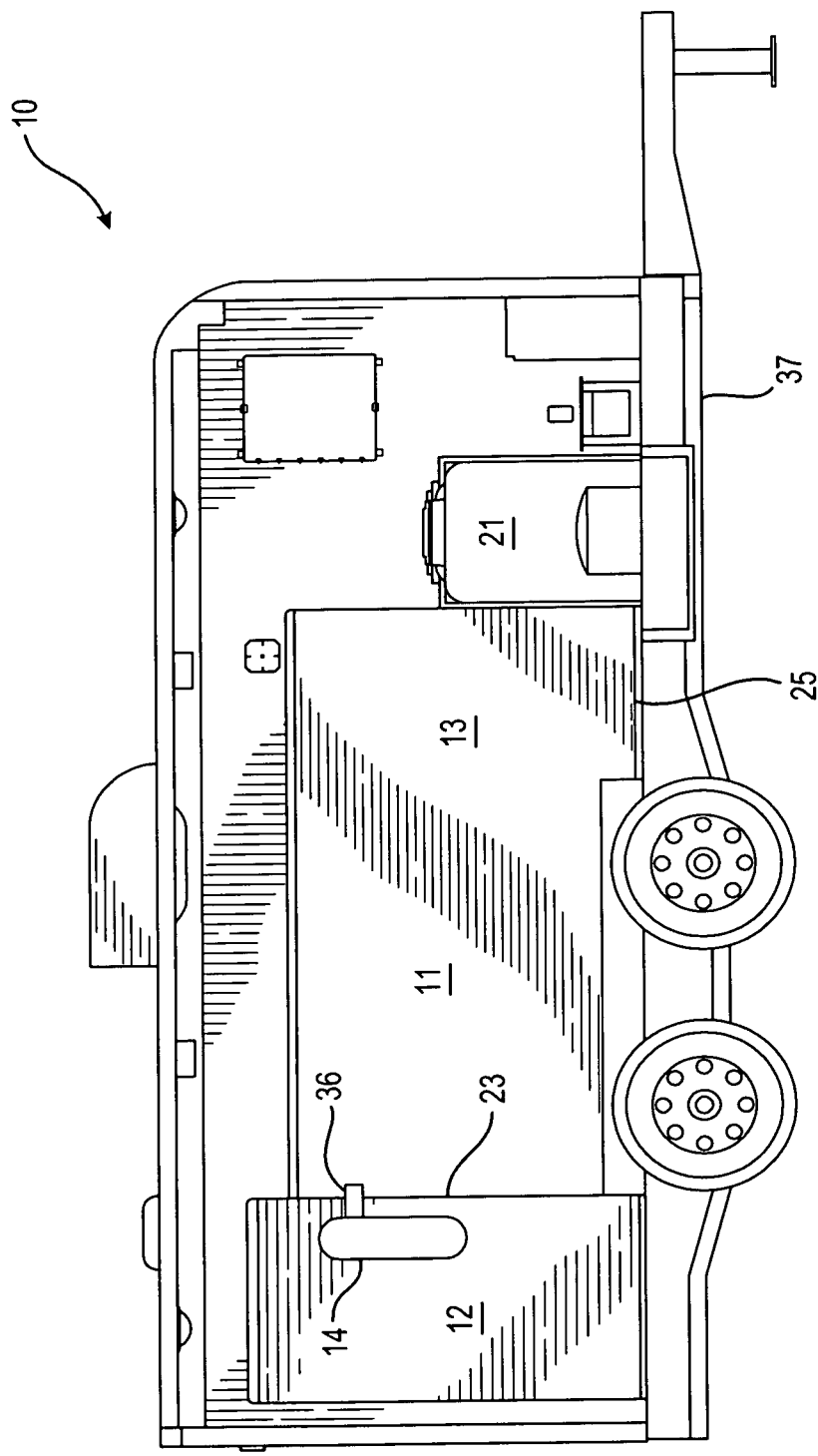
FIG. 2 shows side view of wastewater treatment system 10 in portable trailer 37.
Figure 3:
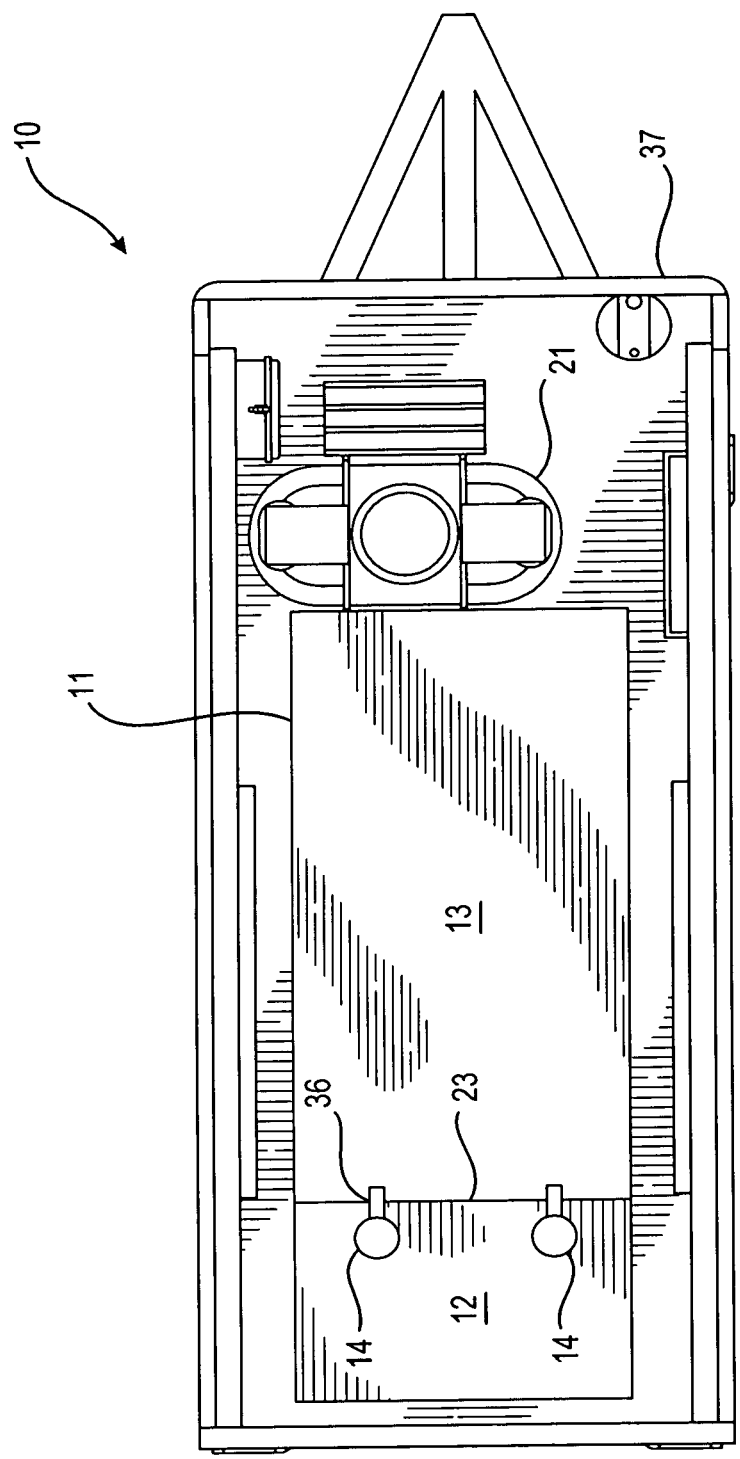
FIG. 3 shows top view of wastewater treatment system 10 in portable trailer 37.

As shown in FIG. 1, the primary components of the wastewater treatment system 10 of the present invention include a wastewater processing tank 11 having a first compartment 12 and a second compartment 13, a set of pre-filters 14, a set of membranes 15, an effluent pump 16 on each membrane 15, a set of blowers 17, a sump pump 18, an anti-foam tank 19 and pump 20, an effluent tank 21, a set of reject pumps 22, and at least one control panel (not shown). As shown in FIGS. 2 and 3, the components of the wastewater treatment system 10 are preferably housed in a portable trailer 37.

Figure 4:
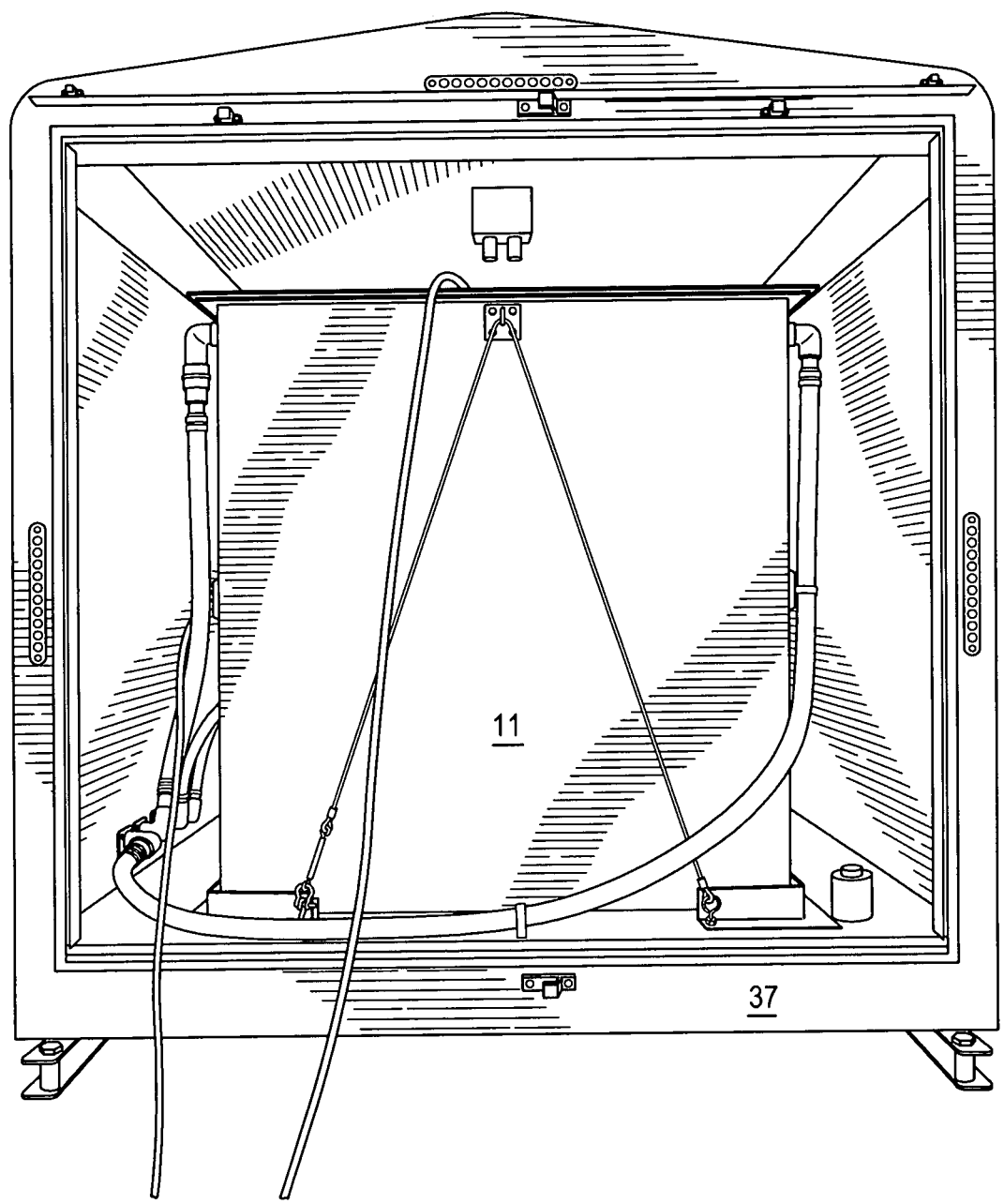
FIG. 4 shows end view of wastewater processing tank 11.
Figure 5:
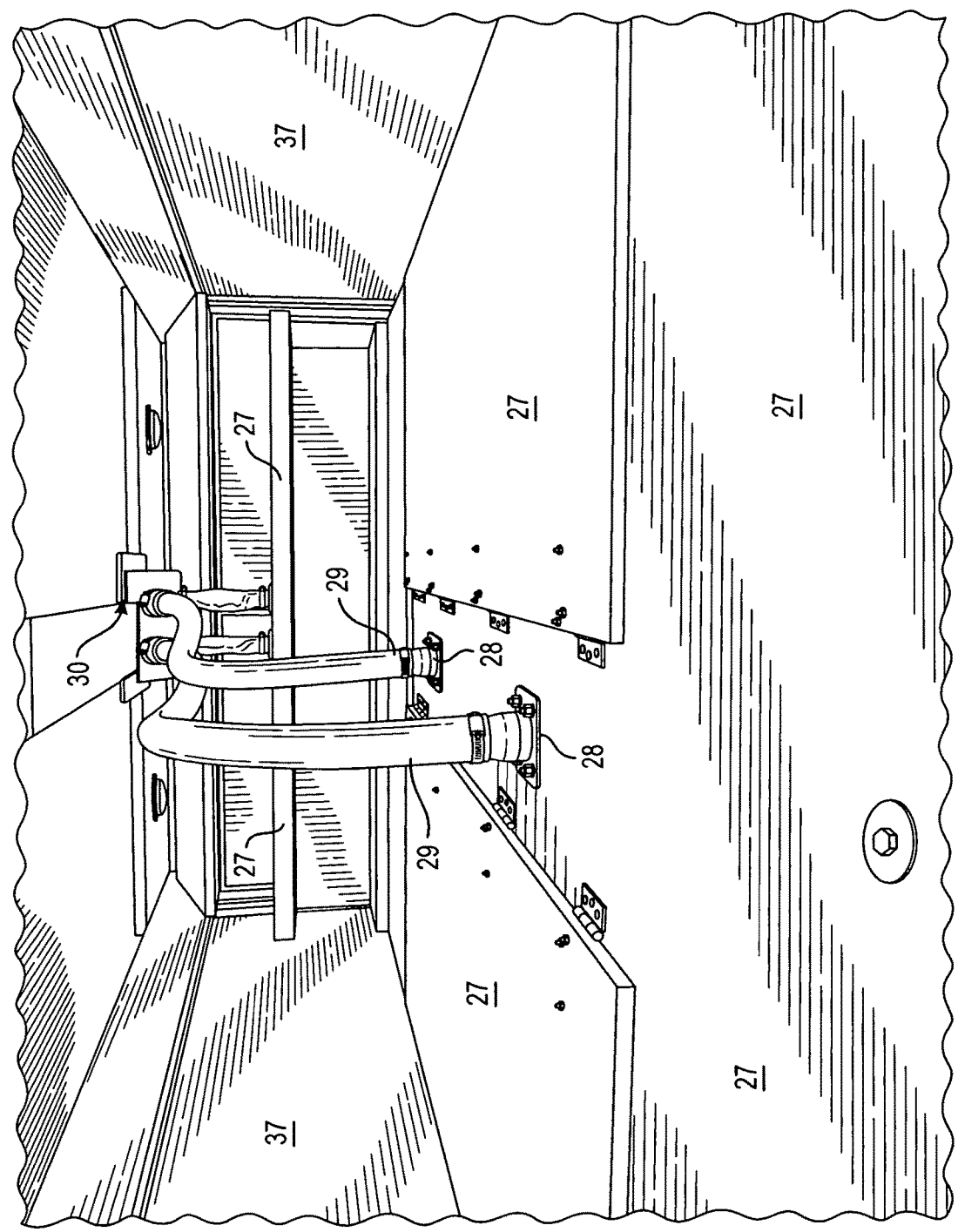
FIG. 5 shows lid 27.

As shown in FIGS. 2, 3, and 4, the wastewater processing tank 11 is preferably rectangular in shape, having a length of approximately thirteen and one-half feet, a width of approximately five feet, and a height of approximately five to six feet. As shown in FIG. 3, the wastewater processing tank 11 preferably has a first compartment 12 and a second compartment 13, where the first compartment 12 and the second compartment 13 are divided by a common, internal wall 22. The preferred dimensions of the first compartment 12 are approximately three and one-half feet long, five feet wide, and six feet tall. The preferred dimensions of the second compartment 13 are approximately ten feet long, five feet wide, and five feet tall. During operation, the first compartment 12 and the second compartment 13 are preferably covered by a lid 27, as shown in FIG. 5. Before placing the wastewater treatment system 10 in service, the second compartment 13 in wastewater processing tank 11 is charged with a starter sludge that has a healthy colony of activated aerobic micro-organisms.

Figure 7:
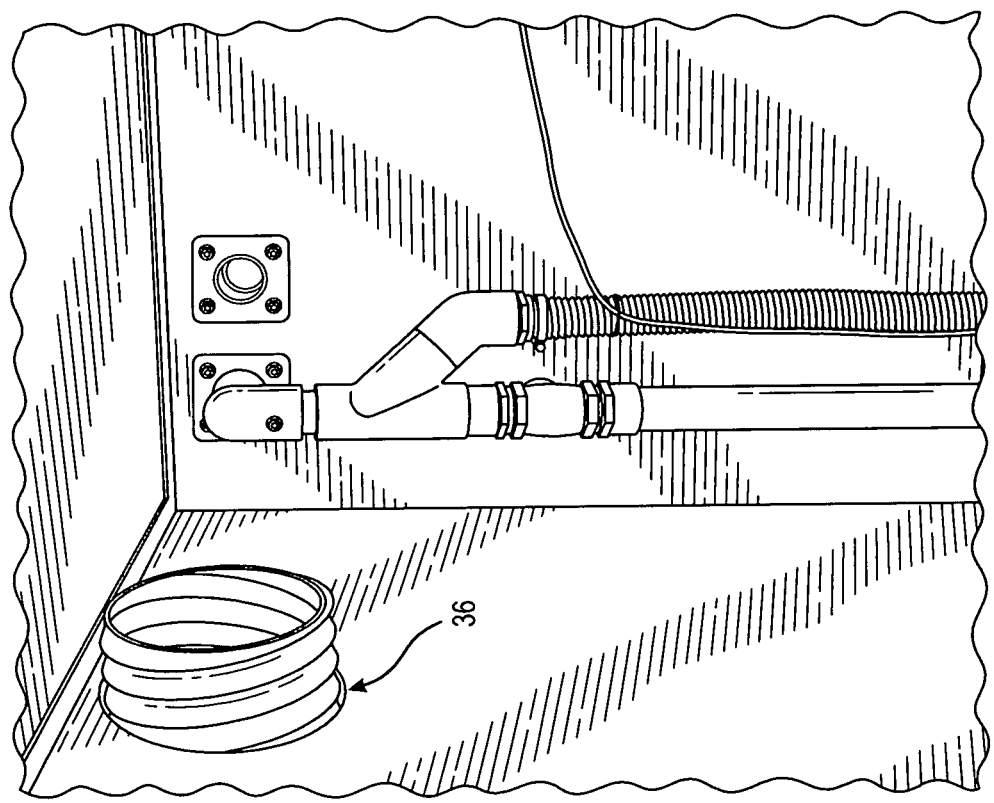
FIG. 7 shows hole 36 in wall 23.
Figure 6:
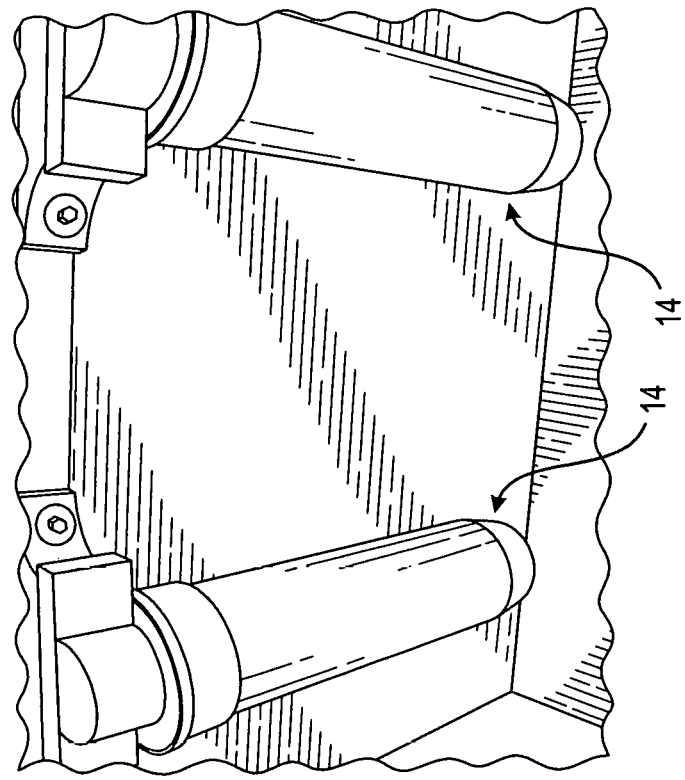
FIG. 6 shows pre-filters 14.

During operation of the wastewater treatment system 10, the incoming wastewater preferably flows through inlet pipe 24 into the first compartment 12 of wastewater processing tank 11, as shown in FIG. 1. As shown in FIG. 6, a set of pre-filters 14 are preferably installed in the first compartment 12 of wastewater processing tank 11 to prevent any oversized debris from entering the second compartment 13 of wastewater processing tank 11. The set of pre-filters 14 are preferably equipped with screens (not shown) that prevent any particles having a diameter over 0.125 inches from entering the second compartment 13 of wastewater processing tank 11. The wastewater stream flowing through the screens (not shown) in the pre-filters 14 enters the second compartment 13 of wastewater processing tank 11 through holes 36 in the internal wall 23, as shown in FIG. 7.

The wastewater stream entering the second compartment 13 of wastewater processing tank 11 is preferably exposed to aerobic micro-organisms that digest the organic matter in the wastewater stream. The blowers 17 preferably introduce air into the bottom 25 of the second compartment 13 of wastewater processing tank 11 through air lines 26, where the end of each air line 26 is equipped with an air diffuser (not shown). As the air exits the air lines through the air diffusers, tiny bubbles are created by the air diffusers, which rise through the wastewater in the second compartment 13 of wastewater processing tank 11. The air bubbles rising through the wastewater in the second compartment 13 of wastewater processing tank 11 oxygenate the micro-organisms in the wastewater, provide mixing action in the wastewater, and provide a cleaning action relative to the outside surfaces of the membranes 15 to keep the membranes functioning properly. Once the air bubbles finish rising through the wastewater, the air exits the second compartment 13 of wastewater processing tank 11 through vent ports 28 in lid 27, which lead to vent hoses 29 and a vent box 30, as shown in FIGS. 1 and 5.

Figure 8:
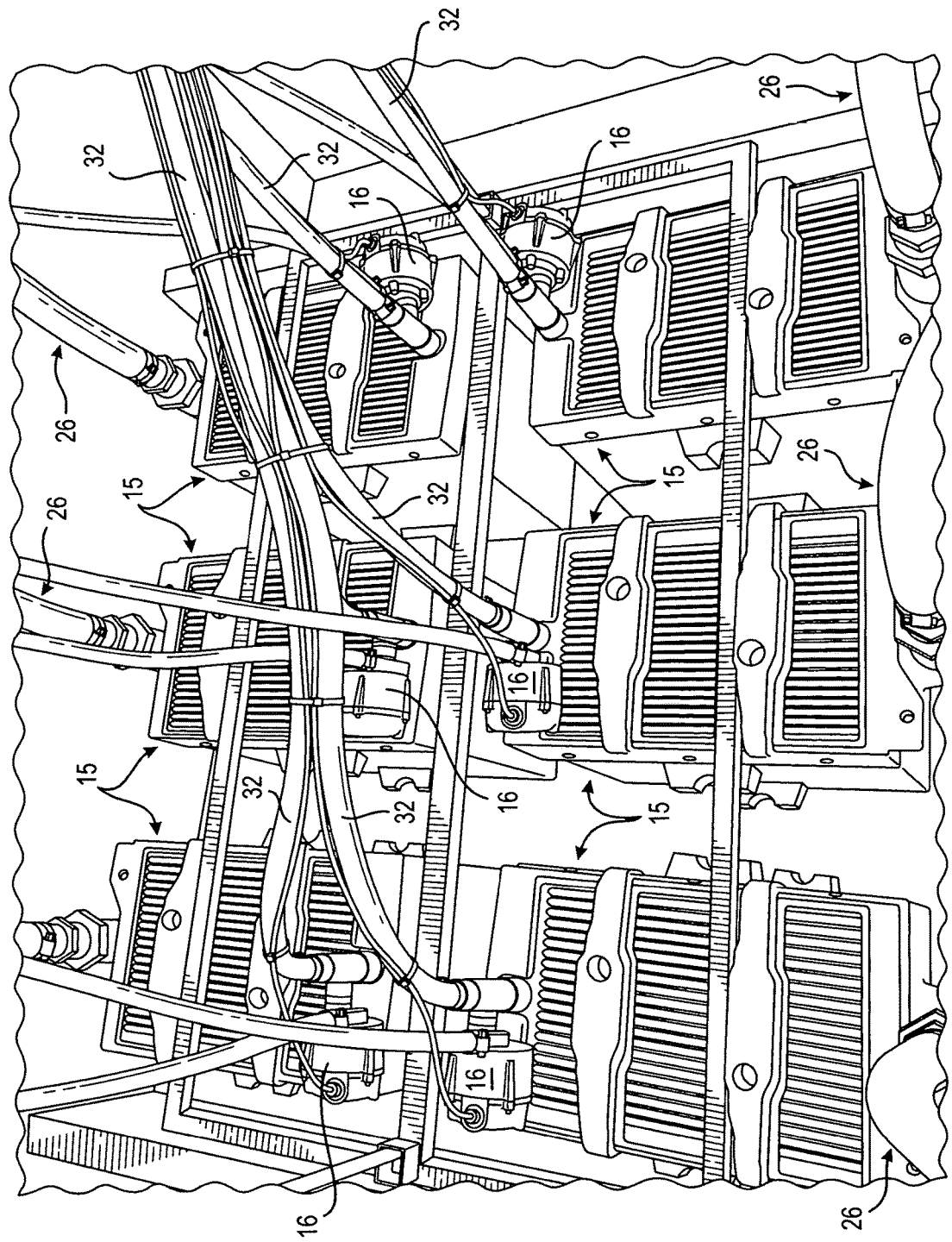
FIG. 8 shows air lines 26.
Figure 9:
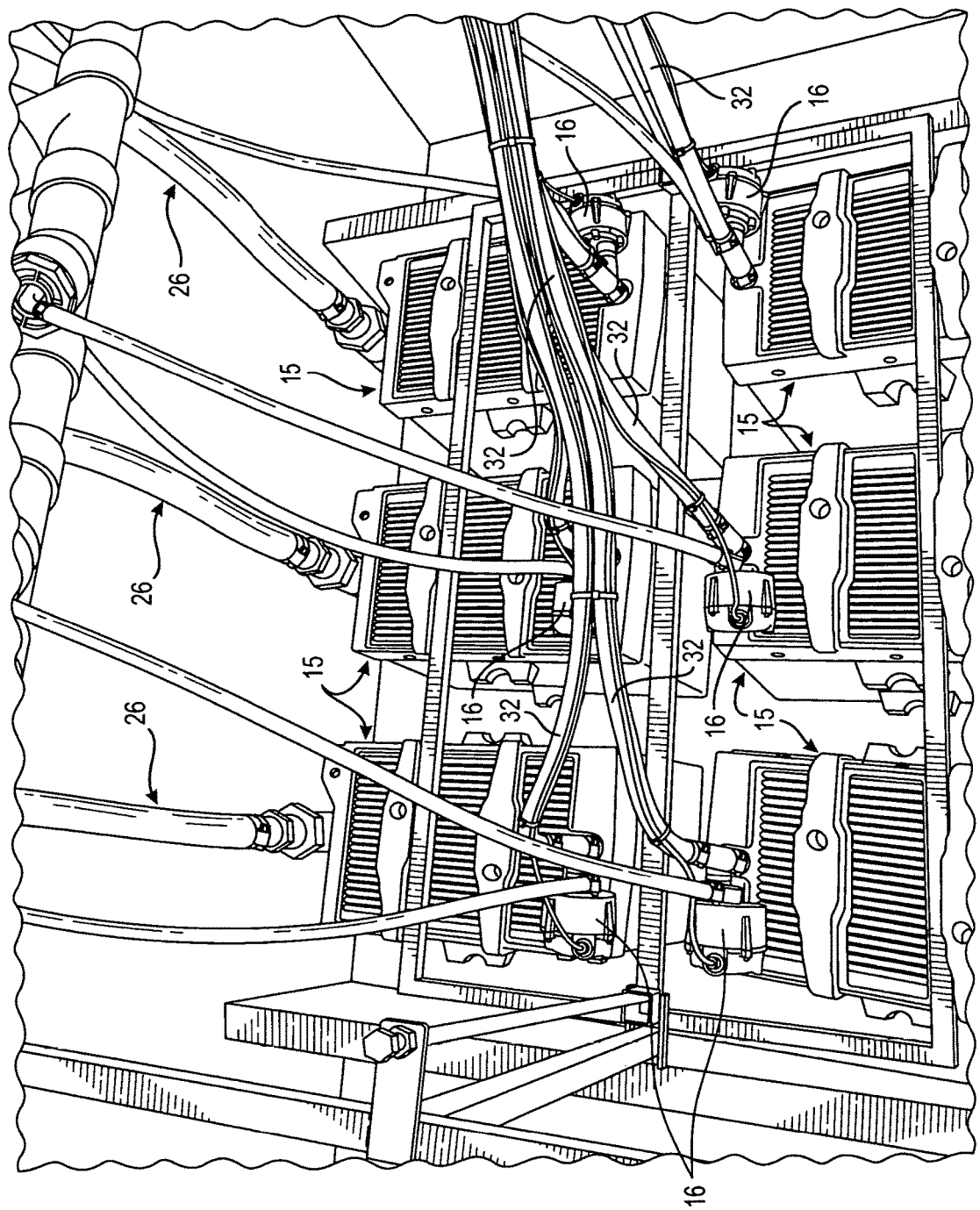
FIG. 9 shows effluent pumps 16 and process lines 31.
Figure 10:
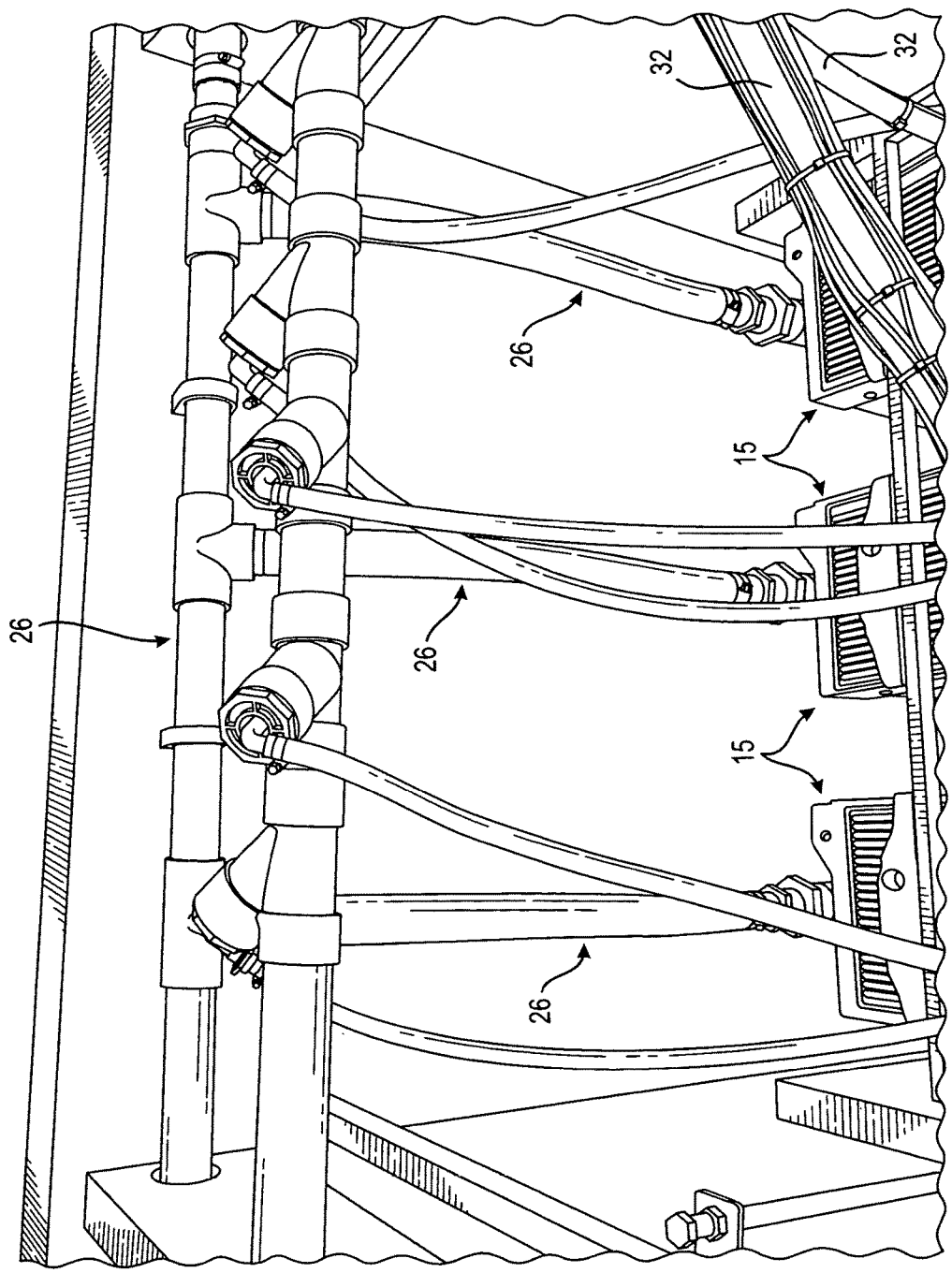
FIG. 10 shows process lines 31 for effluent pumps 16.

The wastewater in the second compartment 13 of wastewater processing tank 11 surround a set of membranes 15 positioned near the bottom 25 of second compartment 13 of wastewater processing tank 11, as shown in FIG. 8. The present invention preferably has six membranes 15 positioned in the second compartment 13 of wastewater processing tank 11. The diffusers (not shown) at the end of air lines 26 are preferably located under membranes 15 so that the air bubbles exiting the diffusers and rising through the wastewater in the second compartment 13 of wastewater processing tank 11 provide a cleaning action relative to the outside surfaces of the membranes 15 to keep the membranes functioning properly.

Each membrane 15 is preferably equipped with an effluent pump 16 designed to create negative pressure inside the membrane 15. The negative pressure draws wastewater through the walls of the membrane 15, but the walls of the membrane 15 prevent all particles larger than approximately 0.09 microns from passing through the walls. The wastewater treatment system 10 is designed to operate with one or all or any combination of the membranes 15 operating at any given time. The effluent pumps 16 are preferably automatically activated using a tank level sensor (not shown) installed in the second compartment 13 of wastewater processing tank 11 to prevent the second compartment 13 from overflowing.

The effluent water passing through the walls of the membranes 15 flows through the effluent pumps 16 and is fed into the effluent tank 21 through process lines 31, as shown in FIGS. 1, 8, 9, and 10. The effluent tank 21 preferably has a chlorine tablet floater (not shown) to add chlorine to the effluent water held in the effluent tank 21.

Figure 12:
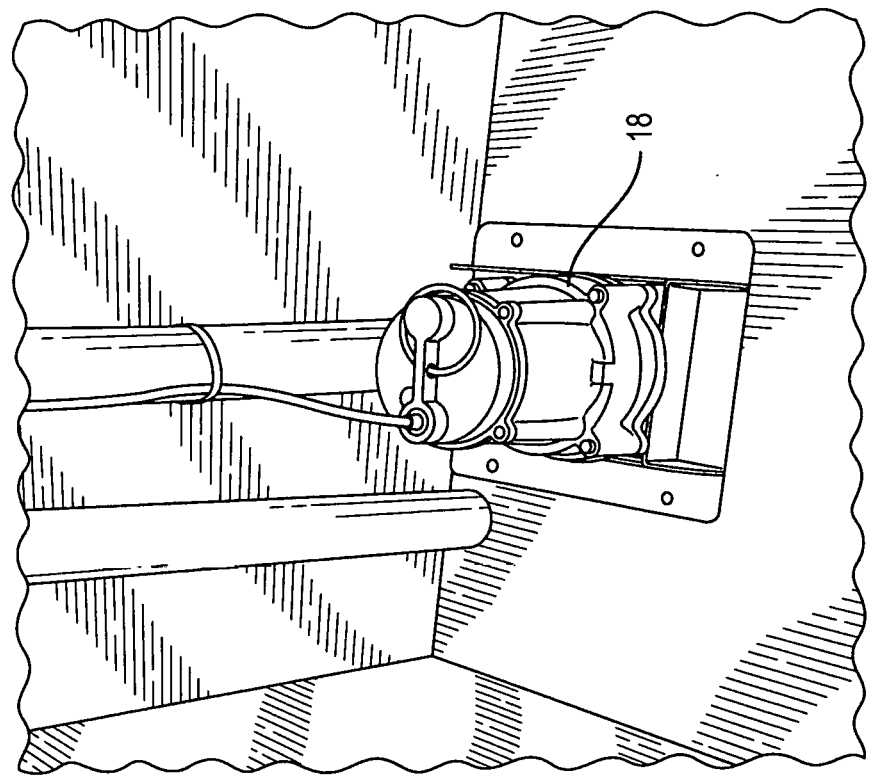
FIG. 12 shows sump pump 18.

The wastewater treatment system 10 of the present invention is preferably equipped with a sump pump 18 installed at the bottom 25 of the second compartment 13 of wastewater processing tank 11, as shown in FIG. 12. The sump pump 18 is preferably manually activated when the level of wastewater in the second compartment 13 of the wastewater processing tank 11 rises above a predetermined set point to prevent the second compartment 13 of the wastewater process tank 11 from overflowing. When activated, the sump pump 18 pumps wastewater through process line 35 from the second compartment 13 of the wastewater process tank 11 to the effluent tank 21.

The wastewater treatment system 10 of the present invention is preferably equipped with an anti-foam system, which includes an anti-foam tank 19 for holding anti-foam reagents and a pump 20 for pumping the anti-foam reagent through process line 33 into the second compartment 13 of the wastewater process tank 11. The anti-foam reagent minimizes the foaming of the wastewater in the second compartment 13 of the wastewater process tank 11 caused by soap, dishwashing detergent, and other such foaming chemicals in the wastewater. The preferred anti-foaming reagent is Defoam 3000 by Aquafix, Inc.

Figure 13:
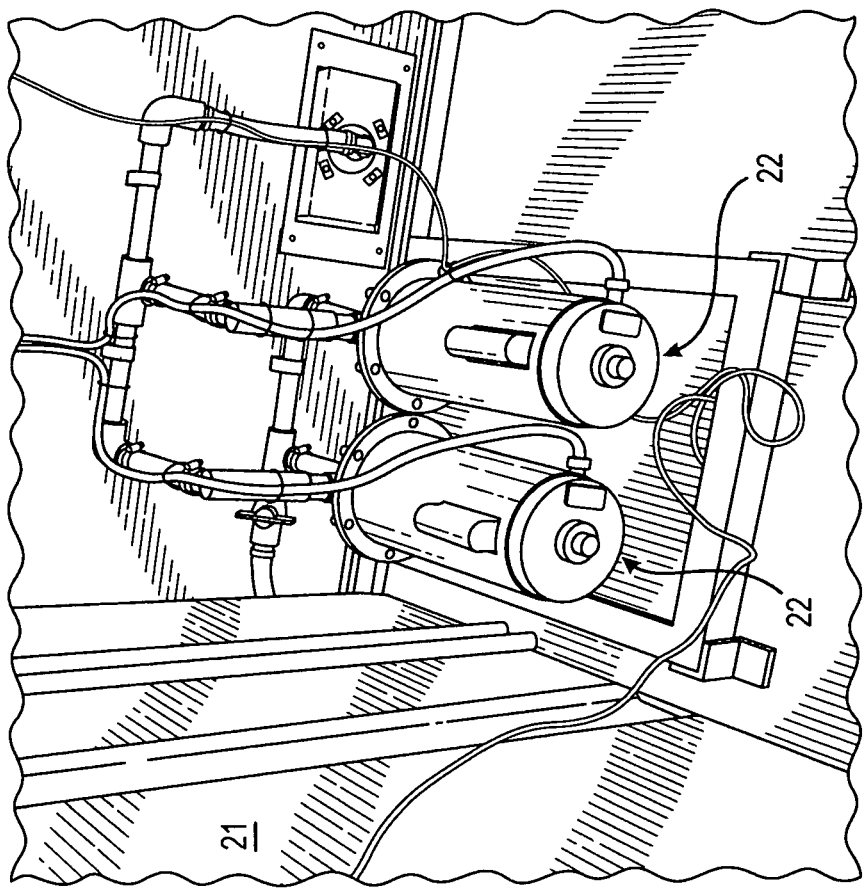
FIG. 13 shows reject pumps 22.

The wastewater treatment system 10 of the present invention is preferably equipped with a set of reject pumps 22, as shown in FIGS. 1 and 13. The reject pumps 22 are preferably activated using a tank level sensor (not shown) installed in effluent tank 21 to prevent the effluent tank 21 from overflowing.

Figure 11:
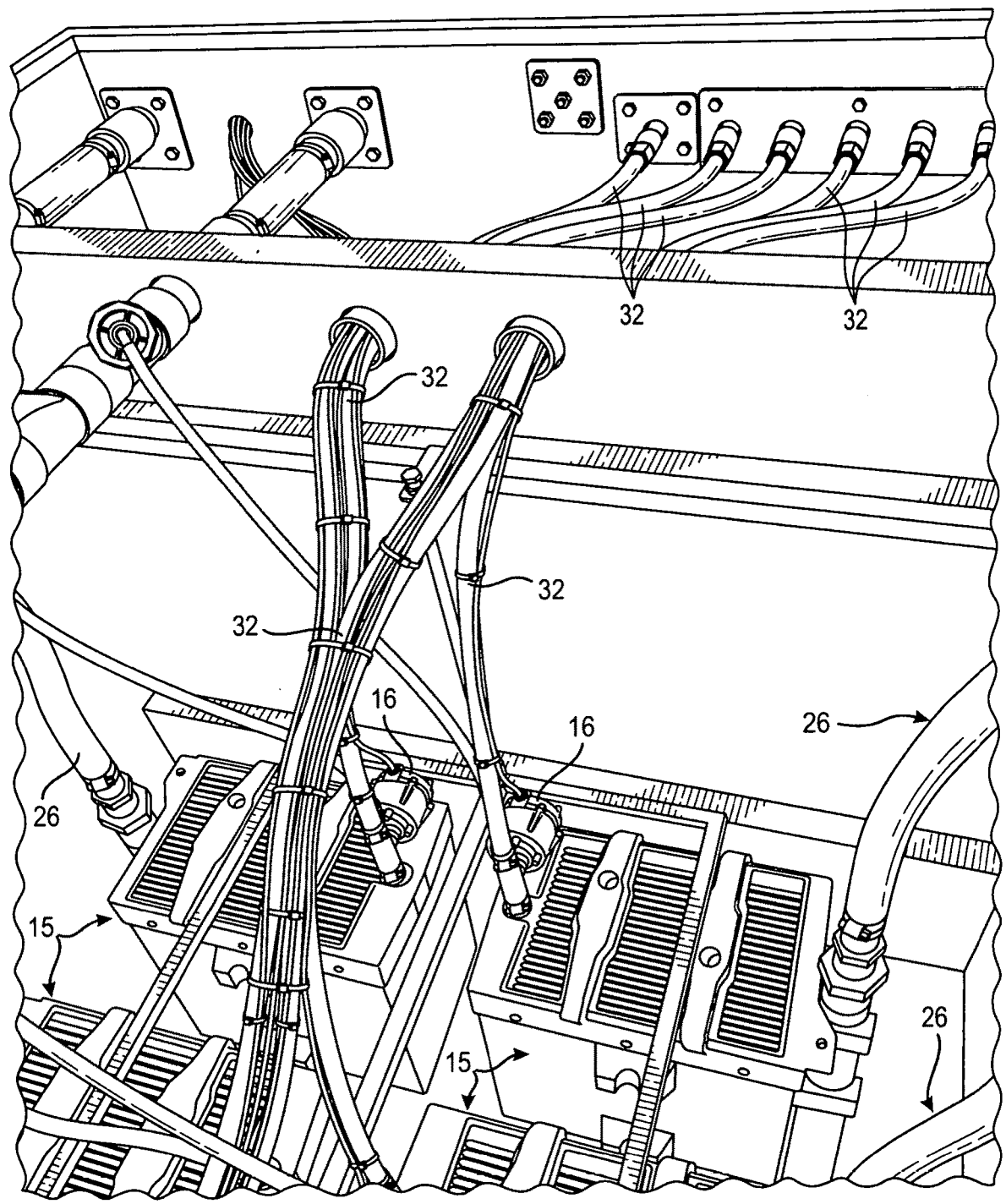
FIG. 11 shows process lines 31 for effluent pumps 16.
Figure 14:
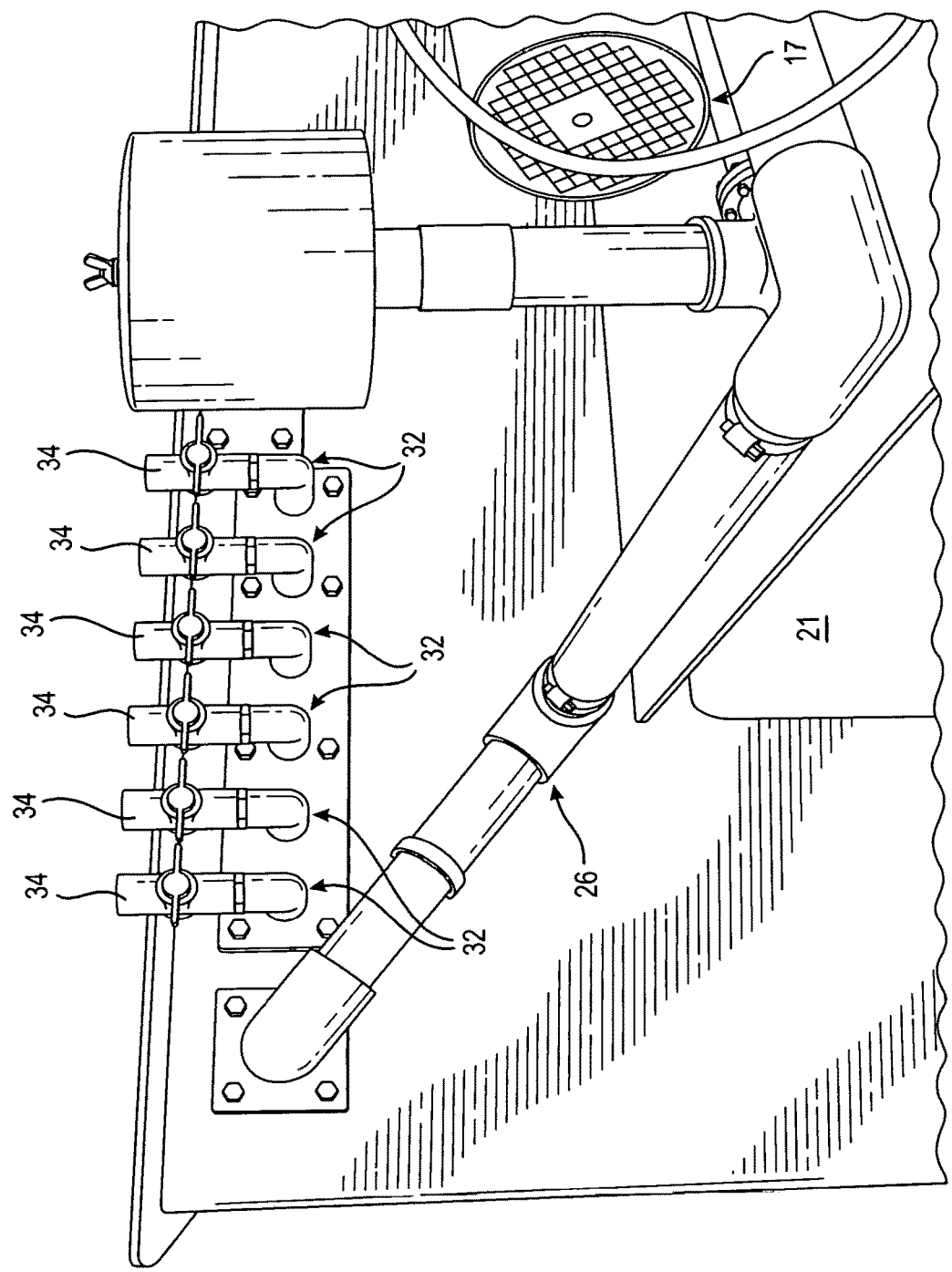
FIG. 14 shows the flush out lines 32 and flush out valves 34.

The wastewater treatment system 10 of the present invention is preferably equipped with membrane flush out lines 32, as shown in FIGS. 1 and 11, which provide a mechanism for flushing out the membranes 15. Each flush out line 32 is equipped with a valve 34, as shown in FIGS. 1 and 14, for controlling the flush out material that is preferably gravity fed to the membranes 15. The preferred flush out material is a Chlorox/water mixture, which acts to release impurities and particulates from the walls of membranes 15.

The effluent water in the effluent tank 21 preferably has sufficient quality to be used for downhole purposes, for dust control on dry land, and for on site wash water. The wastewater treatment system 10 of the present invention is designed to handle approximately 3,000 gallons of waste water per day and designed to maintain the following parameters in the effluent water:
  Total suspended solids ("TSS") less than 10 mg/L;
  Carbonaceous biochemical oxygen demand ("CBOD") less than 10 mg/L;
  E. coli less than 15 MPN/100 ml; and
  pH in the range of 6.5-8.5.

The wastewater treatment system 10 of the present invention is preferably computer controlled to process wastewater based on designated levels in the wastewater processing tank 11. Computer controls are preferably remotely accessible and controllable with internet connectivity from anywhere cell signal or internet is available.

It is understood that one embodiment of the present invention has been disclosed by way of example and that other modifications and alterations may occur to those skilled in the art without departing from the scope and spirit of the present invention.

What is claimed is:

1. A system for treating wastewater, comprising:
   (a) a wastewater processing tank having a first compartment for filtering said wastewater and a second compartment for treating said wastewater with aerobic micro-organisms, where said first compartment and said second compartment are divided by a common wall;
   (b) at least one pre-filter installed in said first compartment of said wastewater processing tank for preventing oversized debris from entering said second compartment of said wastewater processing tank;
   (c) a set of membranes installed in said second compartment of said wastewater processing tank, where each membrane is equipped with an effluent pump designed to create negative pressure inside said membrane, where the negative pressure draws wastewater through said membrane, where particles larger than approximately 0.09 microns are prevented from passing through said membrane, where the wastewater entering each membrane exits said membrane as effluent water, and where said effluent pumps pump the effluent water out of said second compartment of said wastewater processing tank;
   (d) at least one blower for introducing air into said second compartment of said wastewater processing tank through an air line equipped with an air diffuser to create air bubbles that rise through said wastewater in said second compartment of said wastewater processing tank to oxygenate said micro-organisms in said wastewater and provide mixing action in said wastewater;
   (e) a sump pump installed in said second compartment of said wastewater processing tank for pumping effluent water from said second compartment of said wastewater processing tank;
   (f) an effluent tank for receiving and holding effluent water received from: (1) each effluent pump attached to a membrane in said set of membranes installed in said second compartment of said wastewater processing tank; and (2) said sump pump installed in said second compartment of said wastewater processing tank;

(g) at least one reject pump for pumping effluent water from said effluent tank; and (h) a portable trailer for housing said system for treating wastewater.

2. The system for treating wastewater of claim 1, further comprising:

(a) a screen inside each pre-filter to prevent any particles having a diameter over 0.125 inches flowing through each pre-filter from entering said second compartment of said wastewater processing tank;

(b) an anti-foam tank for holding anti-foam reagents and an anti-foam pump for pumping said anti-foam reagents from said anti-foam tank into the second compartment of said wastewater process tank;

(c) a flush out line connected to each membrane in said set of membranes for introducing flush out material to each membrane in said set of membranes, where each flush out line is equipped with a valve for controlling the flow of flush out material to said corresponding membrane; and (d) a lid for covering said first compartment and said second compartment of said wastewater processing tank, said lid having at least one vent port for air to vent from said second compartment of said wastewater processing tank.

3. The system for treating wastewater of claim 2, where said wastewater processing tank is a rectangular box having a length ranging from twelve to fifteen feet, a width ranging from four to six feet, and a height ranging from four to seven feet.

4. The system for treating wastewater of claim 3, where said set of membranes installed in said second compartment of said wastewater processing tank includes six membranes.

5. The system for treating wastewater of claim 4, further comprising a chlorine tablet floater to add chlorine to the effluent water held in said effluent tank.

6. The system for treating wastewater of claim 5, where each of said effluent pumps is activated using a tank level sensor to prevent said second compartment of said wastewater processing tank from overflowing.

7. The system for treating wastewater of claim 6, where said at least one reject pump is activated using a tank level sensor to prevent said effluent tank from overflowing.

8. The system for treating wastewater of claim 7, further comprising a controller for controlling said system for treating wastewater, where said controller enables controlling of said system both on site and remotely through internet connectivity from anywhere cell signal or internet is available.

9. The system for treating wastewater of claim 8, where the effluent water in said effluent tank has the following characteristics:

(a) Total suspended solids less than 10 mg/L;

(b) Carbonaceous biochemical oxygen demand less than 10 mg/L;

(c) $E.$ $coli$ less than 15 MPN/100 ml; and (d) pH in the range of 6.5- 8.5.

10. A multi-step method for treating wastewater, comprising the steps of:

(a) filtering said wastewater in a first compartment of a wastewater processing tank and treating said wastewater with aerobic micro-organisms in a second compartment of said wastewater processing tank, where said first compartment and said second compartment of said wastewater processing tank are divided by a common wall;

(b) preventing oversized debris from exiting said first compartment of said wastewater processing tank and entering said second compartment of said wastewater processing tank by providing at least one pre-filter installed in said first compartment of said wastewater processing tank;

(c) preventing particles larger than approximately 0.09 microns from exiting said second compartment of said wastewater processing tank by providing a set of membranes installed in said second compartment of said wastewater processing tank, where each membrane is equipped with an effluent pump designed to create negative pressure inside said membrane, where the negative pressure draws wastewater through said membrane, where the wastewater entering the set of membranes exits the set of membranes as effluent water, and where said effluent pumps pump the effluent water out of said second compartment of said wastewater processing tank;

(d) introducing air into said second compartment of said wastewater processing tank through an air line equipped with an air diffuser to create air bubbles that rise through said wastewater in said second compartment of said wastewater processing tank to oxygenate said micro-organisms in said wastewater and provide mixing action in said wastewater;

(e) pumping said effluent water from said second compartment of said wastewater processing tank;

(f) receiving and holding said effluent water in an effluent tank, where said effluent water is received by said effluent tank from: (1) each effluent pump attached to a membrane in said set of membranes installed in said second compartment of said wastewater processing tank; and (2) said sump pump installed in said second compartment of said wastewater processing tank; and (g) pumping said effluent water from said effluent tank;.

11. The method for treating wastewater of claim 10, further comprising the steps of:

(a) preventing any particles having a diameter over 0.125 inches from flowing through each pre-filter and entering said second compartment of said wastewater processing tank;

(b) introducing anti-foam reagents from an anti-foam tank into the second compartment of said wastewater process tank;

(c) introducing flush out material through a flush out line to each membrane in said set of membranes, where each flush out line is equipped with a valve for controlling the flow of flush out material to said corresponding membrane; and (d) allowing air to vent from said second compartment of said wastewater processing tank.

12. The method for treating wastewater of claim 11, further comprising the step of adding chlorine to the effluent water held in said effluent tank.

13. The method for treating wastewater of claim 12, further comprising the step of providing a tank level sensor to activate said effluent pumps to prevent said second compartment of said wastewater processing tank from overflowing.

14. The method for treating wastewater of claim 13, further comprising the step of providing a tank level sensor to activate said at least one reject pump to prevent said effluent tank from overflowing.

15. The method for treating wastewater of claim 14, further comprising the step of providing a controller for controlling said wastewater treatment system, where said controller enables controlling of said system both on site and remotely through internet connectivity from anywhere cell signal or internet is available.

\* \* \* \* \*